US006778779B1

(12) United States Patent
Shay et al.

(10) Patent No.: US 6,778,779 B1
(45) Date of Patent: Aug. 17, 2004

(54) FULL-DUPLEX OPTICAL COMMUNICATION SYSTEM

(75) Inventors: Thomas M. Shay, Albuquerque, NM (US); David A. Hazzard, Kirtland, NM (US); Stephen Horan, Las Cruces, NM (US); Jason A. Payne, Tempe, AZ (US)

(73) Assignee: New Mexico State University Technology Transfer Corporation, Las Cruces, NM (US)

( * ) Notice: Subject to any disclaimer, the term of this patent is extended or adjusted under 35 U.S.C. 154(b) by 624 days.

(21) Appl. No.: 09/738,045

(22) Filed: Dec. 15, 2000

Related U.S. Application Data

(60) Provisional application No. 60/170,805, filed on Dec. 15, 1999, and provisional application No. 60/170,889, filed on Dec. 15, 1999.

(51) Int. Cl.[7] .......................... H04B 10/24; H04B 10/00
(52) U.S. Cl. ........................ 398/41; 398/120; 398/123; 398/128
(58) Field of Search .................... 398/41, 120, 123, 398/128, 130, 152, 162, 169, 170

(56) References Cited

U.S. PATENT DOCUMENTS

| | | | |
|---|---|---|---|
| 3,920,983 | A | 11/1975 | Schlafer et al. |
| 4,689,625 | A | 8/1987 | Barmat |
| 4,882,770 | A | 11/1989 | Miyahira et al. |
| 4,888,816 | A | 12/1989 | Sica, Jr. |
| 5,121,243 | A | 6/1992 | Miyahira et al. |
| 5,146,358 | A | 9/1992 | Brooks |
| 5,176,728 | A * | 1/1993 | Fugate et al. ............. 65/472 |
| 5,272,555 | A | 12/1993 | Suzuki |
| 5,815,295 | A * | 9/1998 | Darcie et al. ............. 398/72 |
| 5,838,653 | A * | 11/1998 | Fan et al. ............. 369/275.1 |
| 5,850,441 | A | 12/1998 | Townsend et al. |
| 5,966,224 | A | 10/1999 | Hughes et al. |
| 5,978,121 | A * | 11/1999 | Fischer et al. ............. 398/131 |
| 6,359,712 | B1 * | 3/2002 | Kamitani ............. 398/41 |
| 6,414,773 | B1 * | 7/2002 | Masuzawa et al. ............. 398/152 |

OTHER PUBLICATIONS

Chen, L., et al., "A Sunlight Insensitive Direct Detection Optical Communications System," with L. Chen, L.S. Alvarez, Y.F. Wu, and B. Yin, *Proceedings of SPIE*, No. 2123, pp. 448–454, 1994.

Dick, D.J., et al., "Ultrahigh–Noise Rejection Optical Filter," *Optics Letters*, vol. 16, No. 11, pp 867–869 (Jun. 1, 1991).

Fried, D.L., "Optical Resolution Through a Randomly Inhomogenous Medium for Very Long and Very Short Exposures," *J of Optical Soc if Amer.*, vol. 56, No. 10, pp 1372–1379 (Oct. 1966).

Yin, B., et al., "Theoretical Model for a Faraday Anomalous Dispersion Optical Filter," *Opt Soc of Amer.*, vol. 16, No. 20, pp 16171619 (Oct. 15, 1991).

Yin, B., et al., "Faraday Anomalous Dispersion Optical Filter for the Cs 455 nm Transistion," *IEEE Photonics Tech Ltrs.*vol., 4, No. 5, pp 488–490 (May 1992) with Correction (Apr. 1993).

(List continued on next page.)

*Primary Examiner*—Dzung Tran
(74) *Attorney, Agent, or Firm*—Deborah A. Peacock; Andrea L. Mays; Peacock Myers & Adams

(57) ABSTRACT

A method of full-duplex electromagnetic communication wherein a pair of data modulation formats are selected for the forward and return data links respectively such that the forward data electro-magnetic beam serves as a carrier for the return data. A method of encoding optical information is used wherein right-hand and left-hand circular polarizations are assigned to optical information to represent binary states. An application for an earth to low earth orbit optical communications system is presented which implements the full-duplex communication and circular polarization keying modulation format.

16 Claims, 4 Drawing Sheets

OTHER PUBLICATIONS

Yin, B., et al., "A Potassium Faraday Anomalous Dispersion Optical Filter," *Optics Comm*, vol. 94, pp 30–32 (1992).

Vorflusev, V., et al., "Phase–Separated Composite Films for Liquid Crystal Displays," *Science*, vol. 283, pp 1903–1905 (Mar. 19, 1999).

Wolfe, William L., et al., Editors, *The Infrared Handbook*, Revised Edition, IRIA Environmental Research Institute of Michigan, (1978).

Wolfem W.L., et al., Editors, *The Infrared Handbook*, $3^{rd}$ Edition p. 3–71.

Wilson, et al., "Overview of the Ground to Orbit Lasercom Demostration," *SPIE Proceedings, 2990*, pp 23–30 (1997).

Swenson, C.M., et al., "Low Power FLC–based Retromodulator Communications System," *SPIE Proceedings*, 2990, pp 296–310 in free–Space Laser Communications Technologies IX, G. Stephen Mercherle, Editor (Feb. 1997).

* cited by examiner

FULL-DUPLEX OPTICAL COMMUNICATION SYSTEM

CROSS-REFERENCE TO RELATED APPLICATIONS

This application claims the benefit of the filing of U.S. Provisional Patent Application Serial No. 60/170,805, entitled "Lightwire", filed on Dec. 15, 1999, and also claims the benefit of the filing of U.S. Provisional Patent Application Serial No. 60/170,889, entitled "Circular Polarization Keying", filed on Dec. 15, 1999, and the specifications thereof are incorporated herein by reference.

GOVERNMENT RIGHTS

The U.S. Government has a paid-up license in this invention as provided for by the terms of NASA grant number NAG5-7520.

BACKGROUND OF THE INVENTION

1. Field of the Invention (Technical Field)

The present invention relates to passive optical communications, in particular to full-duplex communications on a single electro-magnetic beam and to the use of circular polarization keying as a modulation format.

2. Background Art

Note that the following discussion refers to a number of publications by author(s) and year of publication. Discussion of such publications herein is given for more complete background and is not to be construed as an admission that such publications are prior art for patentability determination purposes.

Issued patents that have addressed the need for full-duplex communications on a single electro-magnetic beam include U.S. Pat. No. 4,882,770 to Miyahira, et al. entitled, "Wireless Optical Communication System Utilizing a Single Optical Carrier Frequency," which discloses multiplexing for a full-duplex wireless optical short-range communications system by using two oscillators, one to modulate the audio data on a subcarrier frequency, and the other to modulate the subcarrier frequency on an optical infrared carrier frequency. Time division multiplexing is used as the modulation format. U.S. Pat. No. 5,121,243 also to Miyahira, et al. entitled, "Wireless Optical Communication System," also discloses a wireless optical short-range communications system using time division multiplexing. U.S. Pat. No. 5,146,358 to Brooks entitled, "Optical Communications System and Method for Transmitting Information Through a Single Optical Wave Guide," discloses simultaneous bi-directional, multi-channel communication. However, the data is either amplitude or frequency modulated. U.S. Pat. No. 5,272,555 to Suzuki entitled, "Bi-Directional Optional Transmission Method and Apparatus Therefore," discloses bi-directional communication through a single optical path using either frequency modulation, amplitude modulation, or pulse modulation. U.S. Pat. No. 3,920,983 to Schlafer, et al. entitled, "Multichannel Optical Communications System Utilizing Multi-Wavelength Die Laser," discloses a communications system having frequency multiplexed modulated signals in a single beam.

U.S. Pat. No. 5,966,224 to Hughes, et al. entitled, "Secure Communications With Low-Orbit Spacecraft Using Quantum Cryptography," discloses using polarization as well as delay to accomplish secure communications. Vertical polarization and right-hand circular polarization is disclosed to distinguish between zeros and ones, or in the alternative, left-hand circular polarization and horizontal polarization to represent zeros and ones. U.S. Pat. No. 5,850,441 to Townsend, et al., entitled, "System and Method for Key Distribution Using Quantum Cryptography," discloses a cryptograph communication system using polarization modulation. U.S. Pat. No. 5,978,121 to Fischer, et al., entitled, "Method and Device for the Optical Transmission of Data Over Distances in Space," discloses the use of phase modulation to accomplish optical transmission. The light signal containing the information is circularly polarized, but does not use circular polarization as the modulation scheme. U.S. Pat. No. 4,689,625 to Barmat entitled, "Satellite Communications System and Method Therefore," discloses transmitted and received signals operating in the same frequency band but with opposite linear or opposite handed circular polarizations, therefore requiring low power. U.S. Pat. No. 4,888,816 to Fica, Jr., entitled, "Two-Way Optical Communication System for Atmospheric Use," discloses a two-way communication link with reduced light linkage and uses circular polarization, but with an amplitude modulation scheme.

None of these patents implement the unique differential circular polarization keying format and novel architecture for full-duplex communications on a single electro-magnetic beam as in the present invention. Additionally, conventional modulation formats for open air optical communications use amplitude shift keying (ASK), on-off keying (OOK), phase shift keying (PSK), or frequency shift keying (FSK). These modulation formats either only register signal for one state or they require a complex coherent detection system, the advantage of which falls away rapidly if there are any wave front distortions in the atmosphere. In contrast, circular polarization keying (CPK) uses simple paths of optical elements to separate the two circular polarization states and can direct each polarization state to a separate detector. Thus, the signal-to-noise ratio is increased by between 3 and 6 decibels simply by subtracting the output from those two channels. Each channel can be operated in a simple direct detection mode, thus avoiding the complexities of a coherent detection system. Passing circularly polarized light through a quarter-wave plate converts circularly polarized photons into linearly polarized photons. Furthermore, each left-hand circularly polarized photon is converted into a linearly polarized photon with the same polarization direction, while each right-hand circularly polarized photon is converted into a linearly polarized photons whose direction is orthogonal to the direction of the converted left-hand circularly polarized photons. Thus, CPK eliminates the difficulties associated with aligning linear polarization sensitive elements. This is particularly advantageous when certain polarization sensitive elements are used, such as Faraday Anomalous Dispersion Optical Filters, that provide ultra-high background rejection.

The present invention is a system allowing for full-duplex communications on a single electromagnetic beam in a communications system. This is accomplished by choosing data formats such that the forward data format (or "uplink" in the embodiment presented herein) is invisible to the return data format (or "downlink" in the embodiment presented herein). The present invention offers the potential of doubling the data rate of these systems while keeping the power consumption at the remote end very low. The present invention is useful for a passive retro-modulated communications system where a carrier beam is transmitted to a reflector that modulates the infinite carrier and returns it back to the source. In such a system full-duplex communications is often desired, while in conventional systems, time multiplexing is required between the transmit and receive phases. Time multiplexing reduces the data rate in each direction. The present invention overcomes this drawback. No time multiplexing is necessary because the data format in the forward direction is invisible to the data format in the return direction.

The present invention further implements a unique binary modulation format for optical communications. Using CPK modulation the zeros and ones are each represented by one of the two orthogonal circular polarization states. For example, a zero can be represented by right-hand circularly polarized light, and a one represented by left-hand circularly polarized light, or vice-versa. Thus, the presence of a zero or one can be determined by measuring the circular polarization of the incident light.

SUMMARY OF THE INVENTION (DISCLOSURE OF THE INVENTION)

The present invention is a method of full-duplex electromagnetic communication wherein a pair of data modulation formats are selected for the forward and return data links respectively such that the forward data electromagnetic beam also serves as a carrier for the return data. The present invention is further a method of encoding optical information wherein right-hand and left-hand circular polarizations are used to represent binary states.

One embodiment which implements the present invention is a full-duplex optical communication system wherein a laser diode transmitter and downlink receiver are located on the ground and a retro-modulator and uplink receiver are located on an object in space. The transmitter transmits a linearly polarized electro-magnetic beam to the object in space and a first quarter-wave plate converts the linearly polarized beam into a circularly polarized beam. A telescope directs the electro-magnetic beam to the object as well as collects the beam that is returned from the object. The retro-modulator at the object directs the incident beam back to the telescope and also assigns left-handed and right-handed circular polarizations to the returned beam according to binary data bit information. An aperture sharing element is located between the first quarter-wave plate and telescope to separate the transmitted and returned electro-magnetic beams. A second quarter-wave plate converts the returned left and right-handed circularly polarized beams into two orthogonally polarized beams respectively. A first beam splitter is located prior to the second quarter-wave plate and sends a small percentage, such as less than 1%, of the returned beam to a first Faraday Anomalous Dispersion Optical Filter and the remaining percentage of the returned beam to the second quarter-wave plate. A second polarizing beam splitter separates the two orthogonally polarized beams that are received from the second quarter-wave plate into a second and third Faraday Anomalous Dispersion Optical Filter respectively. The two received orthogonally polarized beams from the second and third Faraday Anomalous Dispersion Optical Filters are then subtracted from one another.

The transmitter is preferably a semi-conductor diode laser and the retro-modulator is preferably a liquid crystal retro-modulator. The aperture sharing element preferably comprises a mirror with an opening defined therein. Full-duplex communication is achieved on a single electro-magnetic beam due to the forward and return links being formatted so that they are invisible to one another.

A primary object of the present invention is full-duplex communications on a single electro-magnetic beam.

Another primary object of the present invention is to encode optical information by assigning right-hand and left-hand circular polarizations to represent binary states.

A primary advantage of the present invention is that the forward and return data formats are invisible to one another enabling full-duplex communications on single electromagnetic beam.

Another primary advantage of the present invention is that the use of a circular polarization keying modulation format increases the signal-to-noise ratio by approximately 3 to 6 decibels and allows for direct detection thereby avoiding the complexities of a coherent detection system, and further eliminates the difficulties associated with aligning linear polarization sensitive elements.

Another advantage of the present invention is that through the use of Faraday Anomalous Dispersion Optical Filters, ultrahigh background rejection is accomplished.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate an application of the present invention and, together with the description, serve to explain the principles of the invention. The drawings are only for the purpose of illustrating an embodiment of the invention and are not to be construed as limiting the invention. In the drawings.

Figure 1:
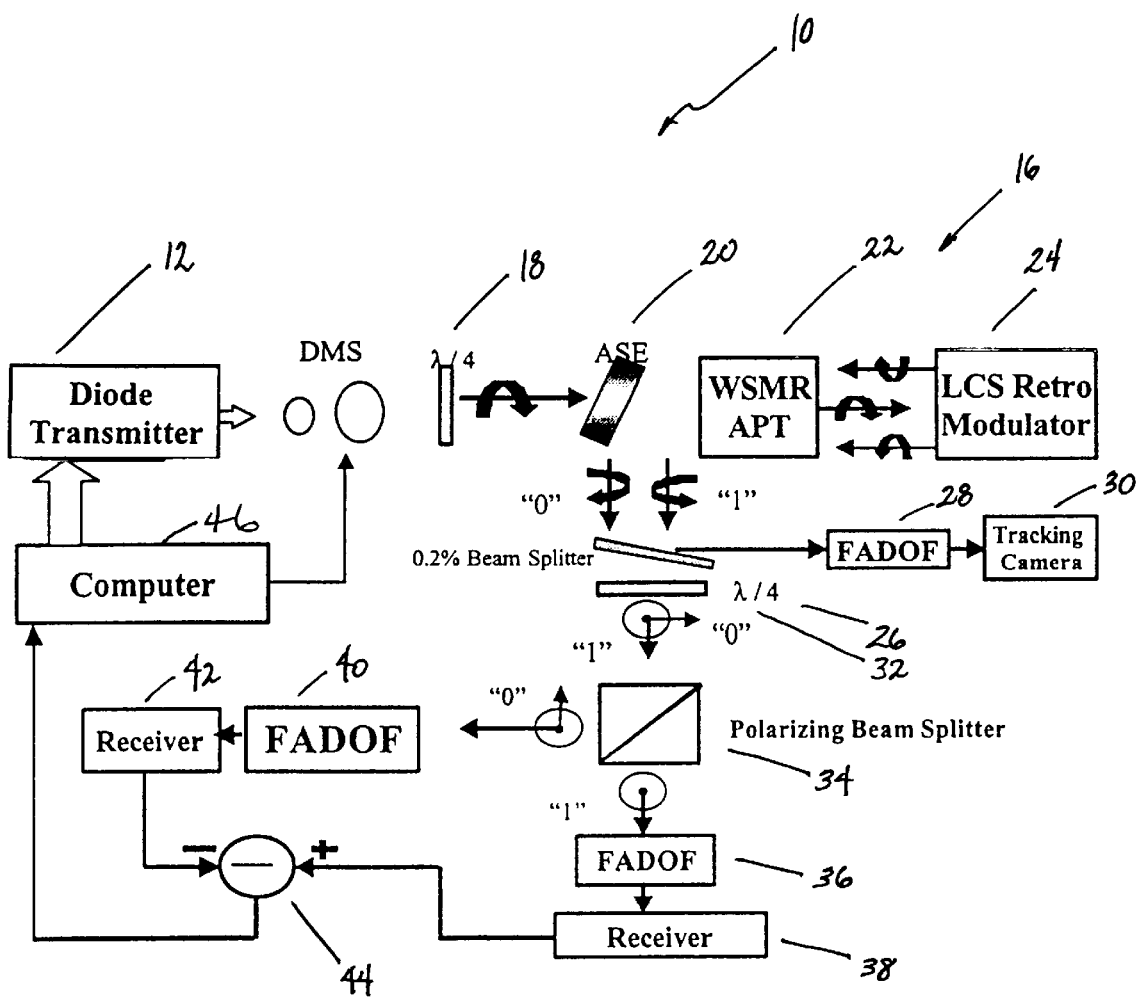
FIG. 1 is a block diagram of an embodiment of the present invention using differential circular polarization keying as the modulation scheme.

DESCRIPTION OF THE PREFERRED EMBODIMENTS (BEST MODES FOR CARRYING OUT THE INVENTION)

The present invention is a system allowing for full-duplex communications on a single electromagnetic beam in a communications system. This is accomplished through the use of data formats where the forward ("uplink" in FIG. 1) data format is invisible to the return ("downlink" in FIG. 1) data format. As an example, if the return data format detects the average energy in a bit period $T_b$, then any forward data format that does not change the return data average energy in a bit period is invisible to the return link data. Thus, the communications link can operate in both directions simultaneously. More specifically, the return data is determined by the average energy in a bit period, $T_b$.

For subcarrier frequency shift key (FSK) encoding, the forward data is invisible regardless of the modulation index if the subcarrier frequencies representing a logical one, $\omega_1$, and a logical zero, $\omega_0$, are integer multiples of $2\pi$ divided by the return data bit period, $T_b$. That is, $$\omega_1 = \frac{2 \cdot \pi}{T_b} \cdot l \quad (1)$$

$$\omega_0 = \frac{2 \cdot \pi}{T_b} \cdot n \quad (2)$$

where n and l represent integers. In this case, the average energy in a bit period is completely unchanged. Any modulation method that causes only a small change in the average energy in a bit period can be used for the forward link. For example, if the forward data link has 100% modulation and $\omega_1$ and $\omega_0$ are both much greater than $2\pi/T_b$, then Eqs. 1 and 2 are approximately true or if the modulation amplitude of the forward data link is small, in both of those examples, the forward link delivers an approximately constant average energy. The present invention for full-duplex communication using a single electro-magnetic beam may be applied to both optical and radio-frequency communications systems.

While nearly all of the optical communications experiments to date utilize either On-off Keying or various coherent optical communications keying (PSK or FSK) and these formats are feasible in accordance with the present invention, circularly polarization keying can also be employed, and in particular differential circular polarization keying, as the modulation format so that the forward data format is invisible to the return data format as will be described in more detail below.

One particular application for the present invention is an earth-to-low-earth-orbit (LEO) optical communication system that offers a lightweight, low power consumption, low data rate communications rate from LEO satellites. The invention provides a novel architecture for a free-space optical communications link as well as a novel data format for free-space optical communications. In this system, both the laser transmitter and the downlink receiver are located on the ground. The optical elements located on the spacecraft, or other object, are a simple uplink receiver and a retro-modulator. Preferably the laser transmitter for this system is a semiconductor device. Assuming a laser transmitter power of −7 dB and a communications data rate of 10 kilobits per second (kbps), link margins of 17 dB for the downlink are achieved. For the uplink, an SC-FSK format is invisible to the downlink and provides a link margin of 20 dB. It is to be understood that while the invention is described in a ground to LEO link, the concepts of the present invention are generally applicable to other free-space optical communications systems as well as earth-bound applications.

This system further includes a Faraday Anomalous Dispersion Optical Filter (FADOF) in the receivers and tracking system to allow for 24-hour operation of the system. The FADOF is described in more detail in D. J. Dick and T. M. Shay, "Ultra-High Noise Rejection Optical Filter," *Optics Letters*, 16, p. 867, June 1991; B. Yin and T. M. Shay, "Theoretical Model of Faraday Anomalous Dispersion Optical Filter," *Optics Letters*, 16, pp. 1617–1619, October 1991; "Faraday Anomalous Dispersion Optical Filter in Potassium," with B. Yin, *Optics Communications*, 94, pp. 30–32, November 1992; and "Faraday Anomalous Dispersion Optical Filter for the Cs 455 nm Transition," with B. Yin, *Photonics Technology Letters*, 4, 488, May, 1992, the disclosures of which are incorporated herein by reference. An FADOF has been used in the receiver of solar blind laser communications systems as described in "A Sunlight Insensitive Direct Detection Optical Communications System," with L. Chen, L. S. Alvarez, Y. F. Wu, and B. Yin, *Proceedings of SPIE*, 2123, pp. 448–454, 1994. The FADOF is an ultra-high background rejection optical filter that essentially prevents skylight from reaching the photodetector while transmitting 80% of the signal photons. If an FADOF is not used in the receiver, then the transmitted laser power would need to be increased by at least a factor of 4 for the acquisition to be feasible for daylight operation at a Zenith angle of $\pi/3$.

Downlink

Attention is now turned to FIG. 1 which is a block diagram of an application of the present invention for a lightweight full-duplex optical wavelength communication system 10 without a laser in space. FIG. 1 is one embodiment of the present invention which demonstrates the principles of the invention and the invention is not to be limited to this specific configuration. Optical transmitter 12 such as a laser diode, transmits a constant average power beam 14 to an object 16, such as a spacecraft in space (not shown in FIG. 1). The transmitted beam is directed through quarter-wave plate 18 that converts the linearly polarized laser beam into a circularly polarized beam. The laser beam is then directed through aperture-sharing element (ASE) 20 that is preferably a mirror having an opening defined through it. The purpose of ASE 20 is to separate the transmitted and returned beam paths. The transmitted beam is next directed through the opening defined in ASE 20 to signal collection apparatus 22, such as a telescope pointer and tracker, for example the White Sands Missile Range Advanced Pointer and Tracker (WSMR APT) and then to spacecraft 16. Earth-bound applications for the present invention may not need a telescope at all, but rather may only require a lens or no signal collection apparatus at all. It is also to be noted that for earth-bound applications, separate apertures may be required for the transmitter and receiver.

The binary data is encoded in the polarization of the return beam using CPK. At the spacecraft 16, a liquid crystal (LCS) retro-modulator 24 flips the right-handed polarized transmitter light into left-handed polarized light to represent a binary "1", while the incident right-handed polarized light is left unchanged for binary "0". In this embodiment, LCS retro-modulator 24 behaves exactly like a corner cube reflector, that is, the retro-modulator directs the beam incident on spacecraft 16 directly back to the signal collection apparatus. Although a liquid crystal modulator is shown in FIG. 1, other types of modulators can be used; for example, an electro-absorption modulator, a corner cube modulator, an electro-optic modulator, an acousto-optic modulator, a liquid crystal electro-absorption modulator, or an interferometric modulator, as well as others. While not shown in FIG. 1, a modulator may be required after transmitter 12 in the uplink, depending upon what type of modulation scheme is used. This modulator can also be of any of the types listed.

Then the signal collection apparatus collects the downlinked signal and directs the signal to ASE 20. The downlink signal is reflected by ASE 20 and is directed to beam splitter 26 that sends 0.2% of the signal through FADOF 28 to the telescope's active tracking camera 30. Most of the return signal passes through beam splitter 26 to the receiver quarter-wave plate 32 which converts the left and right-hand circular polarized light into two orthogonal linear polarizations. The linear polarizations are then separated in polarizing beam splitter 34. The result is that the photons constituting the "0's" are sent to a first FADOF 36 and associated photo-receiver 38 and the photons that constitute the "1's" are sent to a second FADOF 40 and associated photo-receiver 42. Finally, these two signals are electronically subtracted at 44 resulting in a differential circular polarization keying (DCPK) format. A variety of means can be used to accomplish the subtraction including an amplifier, a computer, or a simple resister subtraction circuit. Any standard means of electronic signal combination known in the art can be used to subtract the signals. While FADOFs 28, 36, and 40 are shown in FIG. 1, a variety of other types of filters can be used in accordance with the invention in this embodiment.

An advantage of circular polarization keying is that non-zero signals occur for both states and that the presence of "0's" and "1's" are both detected independently. If $V_1$ is subtracted from $V_0$, then because $V_0=-V_1$ at the threshold detector, the voltage difference between the high and low has doubled. Thus, the received signal power is 6 dB higher than the received signal power for the more conventional OOK format utilizing the same peak transmitter power. In summary, DCPK is a differential form of CPK where the difference between the signal in the two circular polarizations are detected. Another advantage is that a long string of zeros can be distinguished from a dropout since dropout occurs for signal levels near 0 volts and a zero corresponds to $-V_0$ volts. Therefore, Lost, On and Off signals all have different signals. This results in a more appropriate format name for this type of modulation to be CP-Lost-On-Off-Keying or CP-LOOK format. It is to be noted that the downlink is sensitive only to the average power received on each channel during a bit period which will be utilized later. Another advantage of the CP-LOOK format is that since power is always returned, a small percentage of the return signal can be directed to the tracking error loop system used in tracking the object without impacting either the signal coding or significantly reducing the communications signal. Again, while the embodiment shown in FIG. 1 is for communication with an object in space, the present invention has application in earth-bound communications systems as well.

Simple Downlink Model Above

During the communications mode it is desirable to use a narrow transmit beam (approximately 20 microradians) in order to maximize the power incident upon the spacecraft for a given transmitter power. The transmit beam divergence is limited by the atmosphere distortions, and the atmospheric limited beam divergence, $\theta_{Transmit}$, is typically given by:

$$\theta_{Transmit} \approx \frac{\lambda}{r_o} \quad (3)$$

and $$r_o \alpha^{7/6} \quad (4)$$

where $r_0$ represents Fried's radius (see, D. L. Fried, "Optical Resolution Through a Randomly Inhomogeneous Medium for Very Long and Very Short Exposures," *Journal of the Optical Society of America*, 56, pp. 1372–1379, 1966) and $\lambda$ represents the wavelength of interest. A typical Fried radius at 532 nm is 5 cm and that corresponds to a Fried radius of 8.7 cm at 852 nm. Therefore, the beam divergence will typically be limited by the pointing accuracy of the telescope. A beam divergence of approximately 20 microradians is chosen to be conservative.

Typically, the ephemeris uncertainty is 100 m downtrack. This corresponds to approximately ⅙ milliradian. The ephemeris uncertainty is approximately 10 times the communications beam width. Therefore some search mechanism is used to acquire the spacecraft. Instead of mechanically scanning the receiver telescope beam, the system is operated in two modes: first an acquisition mode, and second as soon as the signal is acquired, the system is switched to the communications mode. To ensure rapid tracking convergence, the acquisition mode transmitted beam is wide (approximately 0.4 milliradian) and a receiver integration time of a few milliseconds is used. In a communications mode, the transmitted beam is narrow (approximately 20 microradians) and the integration time short to allow data rates of up to 10 kbps.

Because these two operation modes have different characteristics, the link equation is analyzed separately for the communication and acquire modes.

Received Signal

The link equation for this system is:

$$\text{Margin}=P_{laser}-L-P_{min} \quad (5)$$

where $P_{laser}$ represents transmitted laser power, $P_{min}$ represents the minimum required signal power to close the link, and L represents the total link loss, excluding the scintillation losses.

The 10 dB optical scintillation margin provided a BER of $\sim 10^{-3}$ to $10^{-4}$ in the GOLD experiment (described in K. E. Wilson, J. R., Lesh, K. Araki, Y. Arimoto, "Overview of the Ground to Orbit Lasercom Demonstration," *SPIE Proceedings*, 2990, pp. 23–30, 1997, in Free-Space Laser Communications Technologies IX, G. Stephen Mercherle, Ed.). Thus the link margin must be greater than 10 dB. The sum of the modulator efficiency loss, $L_{mod}$, the atmospheric propagation loss, $L_{atm}$, the telescope loss, $L_T$ and the FADOF transmission loss, $L_{FADOF}$, add up to 9.5 dB. The signal intercept efficiency loss, $L_{SIE}$, is given by:

$$L_{SIE} = -10\log\left(\frac{A}{R^2 \cdot \Delta\Omega}\right) \quad (6)$$

where A represents the receiver area, R the distance from the emitter to the receiver (between 300 and 600 km in a typical LEO), and $\Delta\Omega$ represents the solid angel subtended by the transmitted beam.

$$R = \frac{h_{orbit}}{\cos(\phi)} \quad (7)$$

where $h_{orbit}$ represents the altitude of the orbit and $\phi$ represents the Zenith angle of the spacecraft.

The uplink solid angles are, $\Delta\Omega_{acquire}=5.6\times10^{-7}$ sr and $\Delta\Omega_{comm}=4\pi\times10^{-10}$ sr, for the acquisition and communications modes respectively. Furthermore, the solid angle of the return beam, $\Delta\Omega_{return}$, will typically be limited by the diffraction of the retro-modulator optics. Assuming that the spacecraft is rolled through an angle, $\alpha=34°$ north to maximize the retro-modulator effective area seen from the ground station, then the effective area of the retro-modulator is:

$$A_{\mathit{eff}} = \pi \cdot \left(\frac{D_{retro}}{4}\right)^2 \cdot \cos(\phi - \alpha) \qquad (8)$$

where $D_{retro}$ represents the retro-modulator's diameter, respectively, while $A_{\mathit{eff}}$ represents the retro-modulator's effective area as seen from the ground terminal.

Since the retro-modulator's effective area is an ellipse, the diffraction limited return beam widths are:

$$\vartheta_{return\|} = 0.61 \cdot \frac{\lambda}{D_{retro}} \qquad (9)$$

$$\vartheta_{return\perp} = 0.61 \cdot \frac{\lambda}{D_{retro} \cdot \cos(\phi - \alpha)} \qquad (10)$$

for the down-track and out-of-track angles, respectively. Thus, the diffraction limited return beam solid angle is, $$\Delta\Omega_{return} = \pi \cdot \sin(\theta_{return\perp}) \cdot \sin(\theta_{return\|}) \qquad (11)$$

for small angles this is approximately, $$\Delta\Omega_{return} \approx \pi \cdot \theta_{return\perp} \cdot \theta_{return\|} \qquad (12)$$

Substituting Eqs. 9 and 10 into Eq. 12 we obtain, $$\Delta\Omega_{return} = \frac{\pi}{\cos(\phi - \alpha)} \cdot \left[\frac{0.61 \cdot \lambda}{D_{retro}}\right]^2 \qquad (13)$$

Thus returned signal power, $P_s$, is $$P_s = P_{laser} \cdot \frac{(\eta_T \cdot \eta_{mod} \cdot \eta_{Atm})^2 \cdot \eta_{retro} \cdot \eta_{rbt} \cdot T_{FADOF} \cdot A_{retro} \cdot A_r}{R^4 \cdot \Delta\Omega_{up} \cdot \Delta\Omega_{return}} \qquad (14)$$

where $\eta_T$, $\eta_{mod}$, $\eta_{Atm}$, $\eta_{retro}$, and $\eta_{rbt}$ represent the single pass telescope, modulator, atmospheric, retro-reflector, and receiver beam train losses, respectively. $T_{FADOF}$ represents the signal transmission of the FADOF.

Substituting for R, $A_{retro}$, $\Delta\Omega_{up}$, and $\Delta\Omega_{return}$ in Eq. 14:

$$P_s = P_{laser} \cdot (\eta_T \cdot \eta_{mod} \cdot \eta_{Atm})^2 \cdot \eta_{retro} \cdot \\ \eta_{rbt} \cdot \left(T_{FADOF} \cdot \frac{A_r \cdot D_{retro}^4 \cdot \cos^4(\phi) \cdot \cos^2(\phi - \alpha)}{h_{orbit}^4 \cdot \pi \cdot (1.22 \cdot \lambda)^2 \cdot \theta_{Transmit}^2}\right) \qquad (15)$$

The return signal depends on the orbit altitude, $h_{orbit}$, to the fourth power as expected and also on the retro-modulator diameter to the fourth power, but the signal depends upon the Zenith angle to the sixth power. Thus, a small increase in spacecraft acquisition intercept angle yields large decreases in the required laser transmitter power. The maximum signal power, $P_s(\phi)$ occurs when the spacecraft is at Zenith, the return signal power normalized to the maximum signal power, $P_s(0)$ is presented in FIG. 2.

Figure 2:
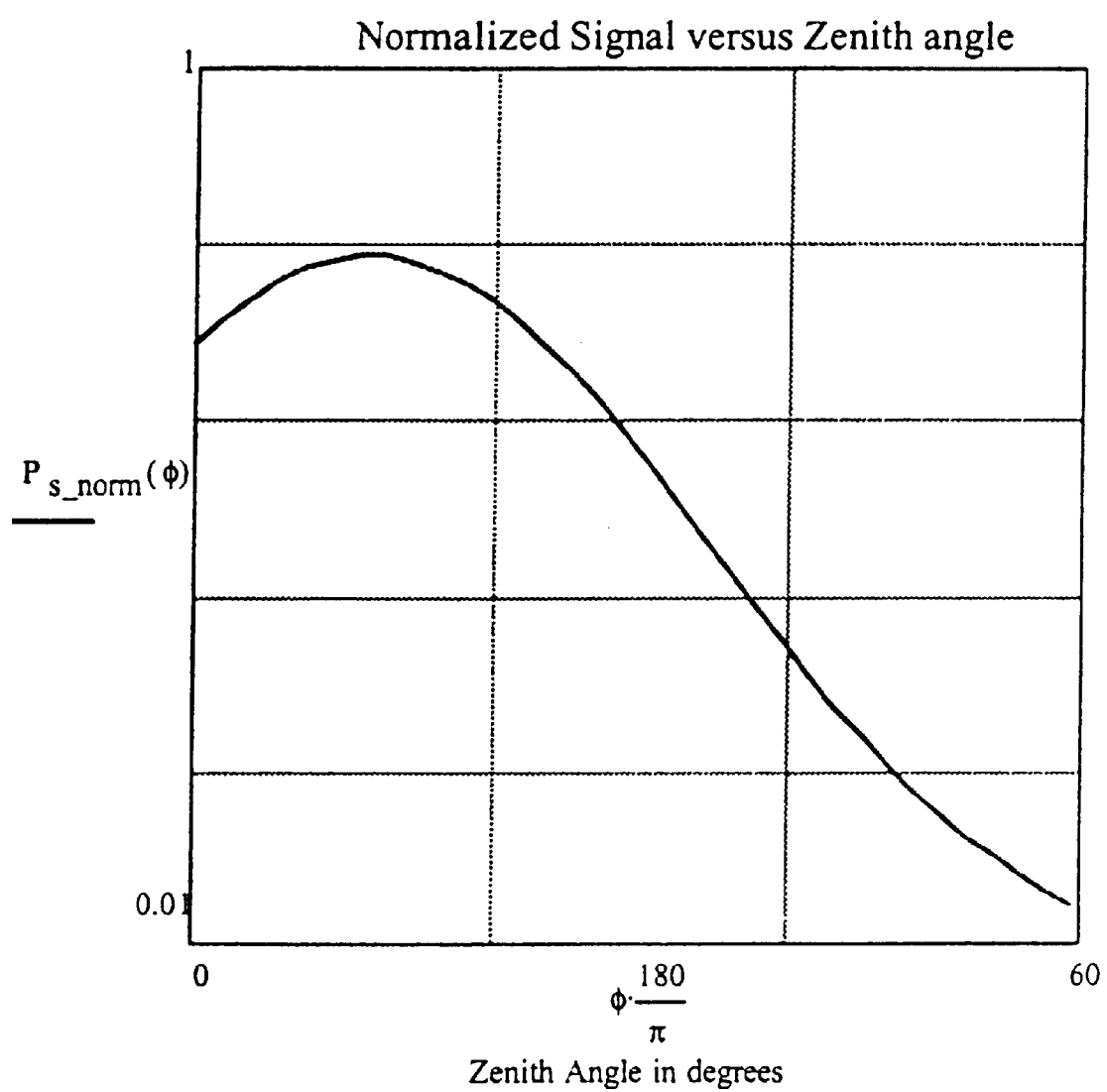
FIG. 2 is a plot of the normalized received signal power versus the spacecraft Zenith angle when using the embodiment of the present invention shown in FIG. 1.

FIG. 2, clearly shows the dramatic dependence of the received signal power versus the spacecraft's Zenith angle. Note that at Zenith the signal power is 15 times stronger than the signal received at a Zenith angle of $\pi/3$. This variation can easily be handled by the receivers.

TABLE 1

SYSTEM CHARACTERISTICS

| | |
|---|---|
| Transmitter power | −7 dB (200 mW) |
| Receiver diameter | 60 cm |
| Retro-modulator diameter | 6 in |
| Data rate | 10 kbps |
| Acquisition integration time | 0.01 sec |
| Scintillation margin | 10 dB |
| Atmospheric loss | 3 dB |
| Modulator loss | 1.4 dB |
| FADOF loss | 1 dB |
| Retro-reflector loss | 0.25 dB |
| Transmit beam divergence (Communications mode) | 20 microradians |
| Transmit beam divergence (Acquisition mode) | 420 microradians |
| Spacecraft intercept angle | $\pi/3$ |

Utilizing the system characteristics in Table 1 the calculated total round trip signal intercept efficiency losses Sat the spacecraft intercept angle are 80 and 104 dB for the communications mode and acquisitions modes, respectively. Note that the 24 dB difference in losses between the communications and acquire signal intercept losses is due only to the difference in transmit beam divergences for the two modes.

The expression for received optical signal power for the system is:

$$P_s = 10\log\left(\frac{P_L}{mW}\right) - L \qquad (16)$$

where L represents the total optical link loss, given by:

$$L = L_{SIE} + L_{mod} + L_{atm} + L_T + L_{FADOF} \qquad (17)$$

Thus, the expected received signal powers are 2.2 nW for the communications mode and 8 pW for the acquisition mode at a spacecraft intercept angle of $\pi/3$ from Zenith. In atmospheric communications the power must be increased to account for atmospheric scintillation. Therefore, these received signal powers need to produce a signal-to-noise ratio that is at least 10 dB higher than the minimum signal-to-noise ratio required for the link.

Signal to Noise Ratio Analysis

The signal-to-noise ratio (SNR) for a DCPK optical communication systems in free space when inter-symbol interference can be neglected is:

$$SNR = \frac{(2 \cdot P_s \cdot (1 - 2 \cdot \varepsilon) \cdot R_{res})^2}{\left(\begin{array}{c} 2 \cdot q \cdot G \cdot B \cdot P_s \cdot (1 - 2 \cdot \varepsilon) \cdot R_{res} + \\ 2 \cdot q \cdot G \cdot B \cdot P_{sky} \cdot R_{res} + 2 \cdot q \cdot G \cdot B \cdot I_D + \\ \frac{4 \cdot k_B \cdot T \cdot B \cdot F_t}{R_L} \end{array}\right)} \qquad (18)$$

where:

$R_{res}$ represents the responsivity of the photodetector, $\varepsilon$ represents the extinction coefficient of the retro-modulator, q represents the electron charge, G represents the photodetector internal gain, B represents the electronic bandwidth, $P_{sky}$ represents the total solar optical noise power that is incident upon the photodetector, $I_D$ represents the photodetectors dark current, $k_B$ represents Boltzman's constant, T represents the load resistor's temperature, $R_L$ represents the load resistance, and $F_t$ represents the noise figure of any electronic amplifiers.

Eq. 18 is valid as long as no optical preamplifier has been employed in the receiver and the photodetector is either a pin photodiode or a photo-multiplier tube. The first term in the denominator is the quantum noise term. The second term is due to solar background noise. The third term is due to the photodetector dark current, and the final term quantifies the resistor and electronic amplifier noises.

The extinction ratio of liquid crystal shutters fall off rapidly with frequency. It is the trade off between liquid crystal extinction ratio and link power penalty due to the non-zero extinction ratio that limits the data rate of the system to 10 kbps. Finally, the measured extinction ratio at 10 kbps is less than 0.035.

The required signal to noise for a digital communications system is calculated using the complex error function. Assuming, that the probabilities of receiving a "1" and "0" are equal, and that the receiver threshold voltage is to set midway between, $V_1+V_0=0$. A bit error rate of $10^{-6}$ requires the electrical SNR=91. This is the minimum SNR that will provide a bit error rate of $10^{-6}$. Therefore, a communications system in the field must exceed that SNR by at least one order of magnitude to overcome scintillation.

Next, the noise components of the system are analyzed. The solar noise that is transmitted through the receiver and FADOF is given by:

$$P_{sky} = \frac{\partial L_e}{\partial \lambda} \cdot \Delta\Omega_{trans} \cdot A_{receiver} \cdot \Delta\lambda_{FADOF} \cdot T_{FADOF} \cdot \eta_T \quad (19)$$

where $$\frac{\partial L_e}{\partial \lambda}$$

represents the spectral radiance of the blue sky, $\Delta\lambda_{FADOF}$ represents the equivalent noise bandwidth of the FADOF, and $T_{FADOF}$ represents the signal transmission of the FADOF.

The solar spectral radiance (see, William L. Wolfe, George J. Zissis, Ed., *The Infrared Handbook*, Third edition, pp. 3–71) at 1-micron is:

$$\frac{\partial L_e}{\partial \lambda} = 10^3 \frac{\mu W}{cm^2 \cdot sr \cdot \mu m} \quad (20)$$

The spectral radiance of the blue sky remains roughly constant as long as the detector is pointing at a region of the sky that is greater than 10 degrees away from the sun. The solar noise incident upon the photodetector filtered by an FADOF is given by:

$$P_{sky} = \frac{\partial L_e}{\partial \lambda} \cdot \Omega \cdot \Delta\lambda \cdot A_{receiver} \cdot T_{FADOF} \cdot \eta_T \quad (21)$$

where $\Omega$ represents the solid angle of the receiver, $\Delta\lambda$ represents the optical bandpass of the FADOF (0.002 nm at 852 nm), and $T_{FADOF}$ represents the signal transmission of the FADOF (80% at 852 nm).

The total optical noise powers from the blue sky that reach the photodetectors are 5 fW and 1.4 pW for the communications and acquisition modes, respectively. The FADOF reduces the blue sky background to an insignificant level for both the daylight communications mode, where $\Delta\Omega=1.27\times 10^{-9}$ sr, and the daylight acquisition mode, where $\Delta\Omega=3.6\times 10^{-7}$ sr. Thus the FADOF makes it possible to operate in daylight as well as night. The characteristics of the photo-multiplier based receivers are listed in Table 2.

TABLE 2

RECEIVER CHARACTERISTICS

| Responsivity | 2,600 amps/watt |
|---|---|
| Quantum efficiency | 0.005 |
| Gain | 750,000 |
| Dark current | 8 nA |
| Load resistance | 100 kΩ |
| Bandwidth | 20 kHz |
| Noise figure | ~1 |

Utilizing the receiver characteristics calculated in Table 2 and $P_{sky}$ for the communications mode, it is easily shown that the signal-to-noise ratio in the communications mode is to a good approximation shot noise limited, thus $$SNR_{comm} = \frac{P_s \cdot \eta_{PMT}}{B \cdot h\nu} \quad (22)$$

where $\eta_{PMT}$ represents the photomultiplier quantum efficiency, hν represents the signal photon energy, and B represents the signal electronic bandwidth. Solving for the minimum required signal power, $$P_{min} = \frac{SNR_{min}}{\eta_{PMT}} \cdot B \cdot h\nu \quad (23)$$

Eq. 23 shows that $P_{min}$ is proportional to $SNR_{min}$ and the electronic bandwidth, B. The minimum required signal power is calculated:

$$P_{min} = 45 \text{ pW} \quad (24)$$

For a 200 mW transmitter, the calculated received power for a spacecraft intercepted at π/3 from Zenith is:

$$P_s = 2.2 \text{ nW} \quad (25)$$

The link margin, M, is:

$$M = 10 \cdot \log\left(\frac{SNR_{comm}}{SNR_{min}}\right) \quad (26)$$

when the system is quantum noise limited, as in the present system, this simplifies to:

$$M = 10 \cdot \log\left(\frac{P_s}{P_{min}}\right) \quad (27)$$

Substituting the calculated powers from Eqs. 24 and 25, the margin equals 17 dB. After subtracting the 10 dB that is required to overcome scintillation effects, there remains a margin of 7 dB.

In this application a single telescope is utilized to serve as both the transmitting and receiving antenna. This monostatic system is subject to strong interference due to transmitter light backscattered off near field aerosols. Therefore, the system is operated with a 50% duty cycle to prevent the interference of near field backscattered transmitter light.

However, this reduces the data rate by a factor of 2, so the electronic bandwidth is:

$$BW = 2 \cdot DR \quad (28)$$

where DR is the signal data rate.

At π/3 from Zenith, in the acquisition mode, both the signal shot noise and the photodetector noise terms contribute to yield a signal-to-noise ratio of:

$$SNR_{acquies} = 2,100 \quad (29)$$

The higher losses during the acquisition mode are overcome by integrating over 10 milliseconds so that the acquisition can be completed quickly. This high signal-to-noise ratio provides for rapid signal acquisition and tracking, so that the communications mode can start shortly after the intercept point is reached.

Finally, the liquid crystal shutter that is utilized is preferably a phase-separated composite liquid crystal shutter (such as described in Valery Vorflusev and Satyendra Kumar, "Phase-Separated Composite Films for Liquid Crystal Displays," *Science*, 283, pp. 1903–1905, 19 Mar., 1999). The extinction ratio of liquid crystal shutters falls off rapidly with frequencies beyond 10 kHz. It is the trade off between liquid crystal extinction ratio and link power penalty due to the non-zero extinction ratio that limits the data rate to 10 kbps, and the invention is not to be limited to a 10 kbps data rate. The liquid crystal shutter system consumes ½ watt of electrical power for unbiased data.

Downlink Summary

The results presented in Table 3 assume a laser transmitter power of −7 dB, a communications data rate of 10 kbps, and an acquisition mode integration time of 10 milliseconds. The day and night signal-to-noise ratios are exactly the same due to the nearly 6 orders of magnitude rejection of the FADOF filter. In fact, during the communications mode, if the spacecraft flies directly in front of the sun so that the ground terminal is looking exactly into the sun, the signal-to-noise ratio is no longer shot noise limited. However, the signal-to-noise ratio only decreased by 5 dB.

TABLE 3

ELECTRICAL LINK MARGINS

| $D_{retro}$ (in.) | Zenith angle | Communication | | Acquire | |
|---|---|---|---|---|---|
| | | Day | Night | Day | Night |
| 6 | π/3 | 17 | 17 | 31 | 31 |

These results show clearly that a 6 inch diameter retro-modulator on board the satellite closes the link easily. The retro-modulator employs wide field lenses to increase its angular acceptance. A wide field-of-view retro-modulator is desirable because it reduces alignment sensitivity of the flight system. Accurate pointing of a spacecraft requires significant flight system resources. In a very significant demonstration experiment that illustrated the potential of retro-modulator communications, Phillips Laboratory and Utah State University (AF/PL/USU) (see, Charles M. Swenson, Clark A. Steed, Imelda A. DeLaRue, Robert Q. Fugate, "Low Power FLC-based Retro-modulator Communications System," *SPIE Proceedings*, 2990, pp. 296–310, in Free-Space Laser Communications Technologies IX, G. Stephen Mercherle, Ed., February 1997) used nine retro-modulators to achieve a field-of-view of ±π/4 in balloon experiments. The single retro-modulator of the present invention offers a field-of-view of greater than ±π/4 and is very light-weight.

Comparison to Previous Retro-modulated Communications

Currently, the only previous retro-modulator work that has been performed is the AF/PL/USU experiment discussed above. A direct comparison of this application of the present invention to that work is shown in Table 4.

TABLE 4

COMPARISON WITH AF/PL/USU EXPERIMENT

| | NASA/ NMSU | AF/PL/USU |
|---|---|---|
| Platform | Space Shuttle | Balloon |
| Altitude | 320 km | 32 km |
| Data rate | 10 kbps | 1.2 kbps |
| Receiver diameter | 0.6 m | 1.5 m |
| Modulator FOV | ±π/4 | ±π/4 |
| Modulator wt. | 2 to 4 kg | 28 kg |
| Modulator area | 70 to 180-cm² | 1 to 10 cm² |
| 24 Hour Capability | Yes | No |
| Transmitter Power | 0.2 W | 5 W |

As seen in Table 4, the present invention exceeds the previous work in a number of categories. First, the platform is the space shuttle resulting in a link that is a factor of 10 higher and nearly a factor of 20 further away than the AF/PL/USU experiment. Second, the data rate is 8 times greater than AF/PL/USU experiment. Third, the receiver diameter is 0.6 m instead of 1.5 m. The modulator fields-of-view are comparable. The weight of the modulator is an order of magnitude lower than 28 kg and the modulator effective area varies between 70 to 18 times the effective area of the AF/PL/USU modulator. 24-hour operation is achieved through the use of an FADOF in the receiver. Transmitter power is over an order of magnitude lower despite extended performance.

Figure 3:
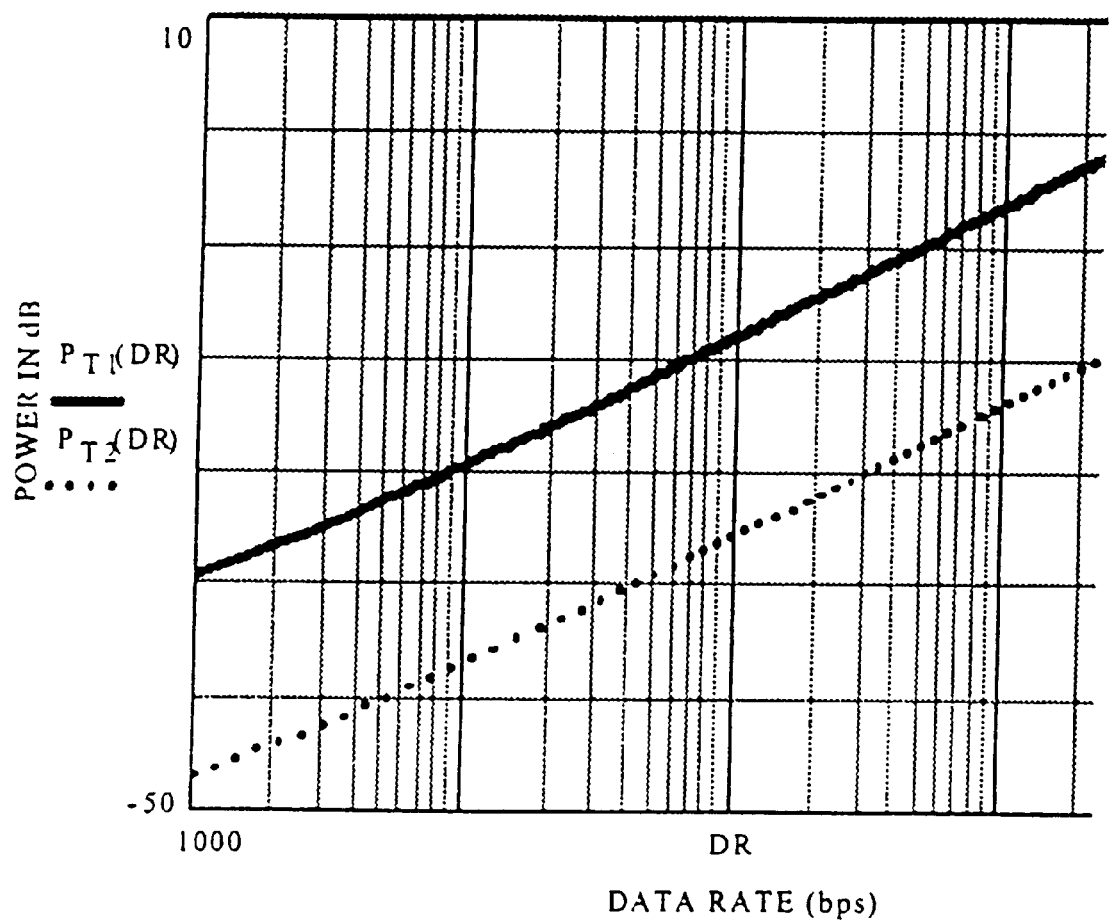
FIG. 3 is a plot of the transmitter power required for the downlink at a spacecraft Zenith angle of $\pi/3$ with a bit error rate of $10^{-6}$ versus the data rate for a 60 cm diameter (solid curve) and 3.5 m diameter (dashed curve) telescope, respectively, using the embodiment of the present invention shown in FIG. 1.

The transmitter power required for the downlink at a spacecraft Zenith angle of π/3 with a bit error rate of $10^{-6}$ is plotted for two different receiver apertures in FIG. 3. The graph shown in FIG. 3 is based on the receiver characteristics listed in Table 2. The two telescope diameters are 60 cm and 3.5 m. The minimum required transmitter power to data bit error rate of $10^{-6}$ is shown on the graph of FIG. 3.

Uplink

It is desirable to have full-duplex communications for the proposed applications of the present invention. An obvious means of doing this is to simply time multiplex the uplink and downlink modes. However, this reduces the data rate in both directions. Therefore, the present invention implements a novel set of paired formats where the forward data is invisible to the return data and hence the electro-magnetic beam can simultaneously serve as the carrier for the return data. One optical beam provides full-duplex operation without any penalty in data rate or signal-to-noise ratio.

Figure 4:
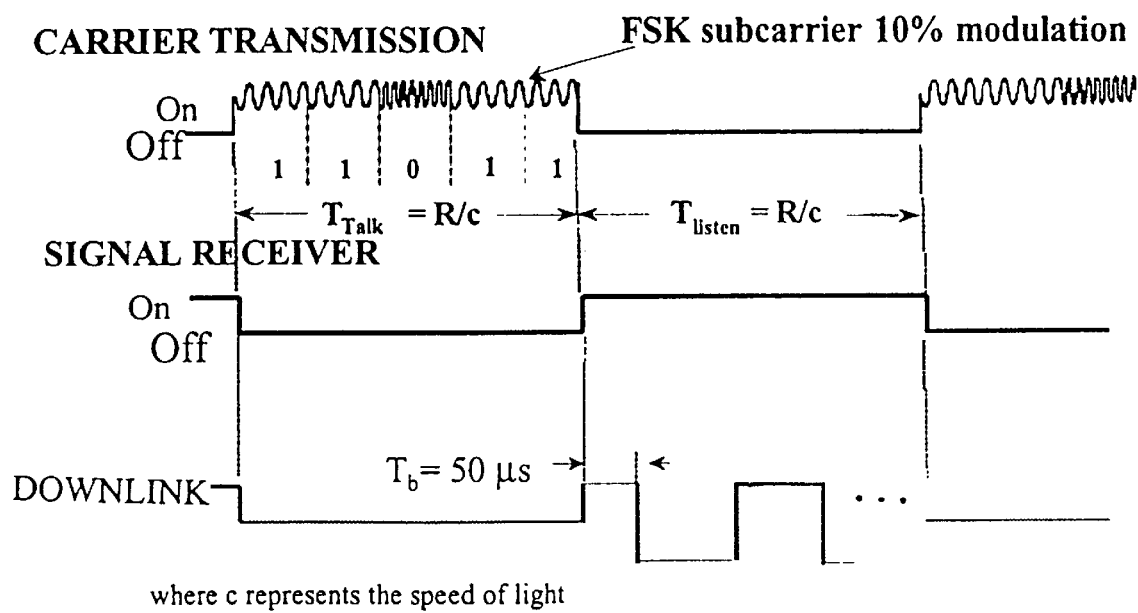
FIG. 4 is a diagram showing the signals for the carrier transmission, receiver, and downlink operating with a differential circular polarization keying format and demonstrating full-duplex communication on a single carrier electromagnetic beam in accordance with the embodiment of FIG. 1.

To accomplish this, different modulation schemes are used for the uplink and downlink. For the downlink in the embodiment shown in FIG. 1, the DCPK modulation described above is used. For the uplink in the embodiment of FIG. 1, sub-carrier PSK (SC-PSK) or FSK modulation with a small modulation index can be used. The DCPK modulation format detects the difference between the total number of photons received in the two polarizations; because the SC-PSK or FSK modulation does not change the average transmitted power the two modulation formats are transparent to one another. Hence, the uplink and downlink formats are invisible to each other, allowing full-duplex operation with one laser beam. At the spacecraft the photodetector converts the optical photons into a RF electrical signal and then at that point conventional PSK or FSK signal processing is utilized. FIG. 4 illustrates this concept operating in conjunction with the DCPK format. Note the system operates in two modes: talk and listen. During the talk mode the transmitted beam is on and the receiver is gated off and during the listen mode, the receiver is gated on and the transmitter is off. Although the DCPK and SC-PSK or SC-FSK format pair are described, the results are generally applicable to any other format pair that meets the invisibility requirement. For example, an on-off keying downlink with a PSK or FSK uplink also constitute, an acceptable format pair.

Uplink Model

A system with a DCPK downlink is compatible with many possible uplink formats. Two obvious choices are PSK and FSK. PSK has the well known 3 dB signal-to-noise ratio advantage over FSK. However, the disadvantage of PSK is the need for an absolute phase reference or, alternatively, the first bit in any transmission block can provide the phase reference and differential PSK can be employed. To simplify the uplink receiver and to optimize the data throughput, SC-FSK is preferably employed for the uplink. A simple PLL tone decoder is used as the receiver.

The optical power incident upon the spacecraft, $P_r$, is:

$$P_r = I_i A_{PD}[1 + m \cos(\omega_{FSK} t)] \quad (30)$$

where $P_r$ represents the received optical power at the spacecraft, $I_i$ represents the signal intensity incident upon the spacecraft, m represents the modulation index, and $\omega_{FSK}$ represents the subcarrier frequency.

The uplink signal-to-noise ratio is:

$$SNR = \frac{\frac{1}{2}(m P_r R_{PD})^2}{2qB(P_r R_{PD} + I_D) + RIN \cdot B(P_r R_{PD})^2 + \frac{4k_B T \cdot B}{R_L} F_t} \quad (31)$$

where q represents the electron charge,

B represents the electronic bandwidth, $R_{PD}$ represents the photodetector responsivity, $I_D$ represents the photodetector's dark current, RIN represents the laser's relative intensity noise, $k_B$ represents Boltzman's constant, T represents the temperature in degrees Kelvin, $R_L$ represents the load resistance, and $F_t$ represents the noise figure of the amplifier.

For a designed receiver area of 4 cm² the received power at the spacecraft is 180 nW. Assuming a modulation index, m=0.1, a photodetector responsivity, $R_{PD}$=0.6 amps/watt, a data rate of 10 kHz, a relative intensity noise, RIN=−130 dB/Hz, and a load resister, $R_L$=25 kΩ, the signal-to noise ratio for this SC-FSK modulation uplink is 40 dB. Thus, there is a margin of 20 dB for the uplink.

Conclusion

The application of the present invention shown in FIG. 1 for a passive optical communications system provides a telemetering link to LEO for Zenith angles of ±π/3. A data rate of 10 kbps over this entire range is achieved using a transmitter laser power of about 200 mW. The novel circular polarization keying format for free-space optical communications allows full-duplex communications using a single optical beam.

Additional applications for the present invention include point-to-point open-air optical links. One specific example is a high data rate building-to-building links, and another example is a relatively low data rate ground-to-earth orbiting satellite link. Furthermore, CPK is compatible with very lightweight optical communications to low earth orbit and thus may be useful as a communications system for nano-satellites. The full-duplex on a single electro-magnetic beam also has application in the area of passive communications, in low data rate wireless systems that have severe power consumption constraints, and cellular phone technology.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An full-duplex optical communication system comprising:
   a transmitter for transmitting a linearly polarized electromagnetic beam to an object;
   a first quarter-wave plate for converting the linearly polarized beam into a circularly polarized beam;
   a signal collection apparatus for directing the beam to the object and collecting the beam returned from the object;
   a retro-modulator for directing the beam incident on the object back to said signal collection apparatus and for assigning left-handed and right-handed circular polarizations to the returned beam according to binary data bit information;
   an aperture sharing element for separating the transmitted and returned electromagnetic beams;
   a second quarter-wave plate for converting the left and right-handed circularly polarized beams into two orthogonally polarized beams respectively; and
   at least one beam splitter for separating the two orthogonally polarized beams.

2. The system of claim 1 wherein said transmitter comprises a diode laser.

3. The system of claim 1 wherein said aperture sharing element comprises a mirror with an opening defined therein.

4. The system of claim 1 wherein said retro-modulator comprises a liquid crystal retro-modulator.

5. The system of claim 1 wherein said at least one beam splitter comprises:
   a first beam splitter for sending less than 1 percent of the returned beam from said aperture sharing element to a first FADOF and the remaining portion of the returned beam to said second quarter-wave plate; and
   a second polarizing beam splitter for separating the two orthogonally polarized beams.

6. The system of claim 5 further comprising:
   a second FADOF for receiving one of the orthogonally polarized beams from said second polarizing beam splitter;
   a third FADOF for receiving the other of the orthogonally polarized beams from said second polarizing beam splitter; and means for subtracting the orthogonally polarized beams.

7. The system of claim 1 wherein said system is capable of achieving a data rate of up to 10 kbps with a signal-to-noise-ratio greater than 2,100.

8. The system of claim 1 wherein said transmitter transmits a beam having a signal power less than or equal to 0.2 watts.

9. A method of full-duplex electro-magnetic communication, the method comprising the steps of:

selecting a pair of data modulation formats for forward and return data links respectively such that a forward data electro-magnetic beam also serves as a carrier for return data;

transmitting a linearly polarized electromagnetic beam to an object;

converting the linearly polarized beam into a circularly polarized beam;

directing the beam to the object and collecting the beam returned from the object;

assigning left-handed and right-handed circular polarizations to the beam incident on the object according to binary data bit information;

separating the transmitted and returned electromagnetic beams;

converting the left and right-handed circularly polarized beams into two orthogonally polarized beams respectively; and separating the two orthogonally polarized beams.

10. The method of claim 9 wherein the step of transmitting comprises transmitting with a diode laser.

11. The method of claim 9 wherein the step of separating the transmitted and returned electromagnetic beams comprises separating with an aperture sharing element comprising a mirror with an opening defined therein, through which the transmitted and returned beams pass.

12. The method of claim 9 wherein the step of assigning left-handed and right-handed circular polarizations to the beam incident on the object according to binary data bit information comprises flipping the incident right-hand polarized beam into a left-hand polarized beam to represent a first binary state and leaving the incident right-hand polarized beam unchanged for the second binary state.

13. The method of claim 9 wherein the step of separating the transmitted and returned electromagnetic beams further comprises sending less than 1 percent of the returned beam to a first FADOF and the remaining portion of the returned beam to a second quarter-wave plate to be converted into the two orthogonally polarized beams.

14. The method of claim 13 wherein the step of separating the two orthogonally polarized beams comprises:

receiving one of the orthogonally polarized beams at a second FADOF;

receiving the other of the orthogonally polarized beams with a third FADOF; and subtracting the orthogonally polarized beams received by each of the FADOFs.

15. The method of claim 9 further comprising the step of achieving a data rate of up to 10 kbps with a signal-to-noise-ratio greater than 2,100 during the optical communication.

16. The method of claim 9 wherein the step of transmitting a linearly polarized electromagnetic beam to an object comprises transmitting a beam having a signal power less than or equal to 0.2 watts.

* * * * *